(12) United States Patent
Ota

(10) Patent No.: US 8,484,223 B2
(45) Date of Patent: Jul. 9, 2013

(54) IMAGE SEARCHING APPARATUS AND IMAGE SEARCHING METHOD

(75) Inventor: Yuya Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/027,714

(22) Filed: Feb. 15, 2011

(65) Prior Publication Data

US 2011/0202523 A1 Aug. 18, 2011

(30) Foreign Application Priority Data

Feb. 17, 2010 (JP) ................................ 2010-032908
Nov. 9, 2010 (JP) ................................ 2010-250749

(51) Int. Cl.
*G06F 17/30* (2006.01)

(52) U.S. Cl.
USPC .......................................... 707/748; 707/758

(58) Field of Classification Search
USPC ................................................ 707/748, 758
See application file for complete search history.

(56) References Cited

U.S. PATENT DOCUMENTS

| | | | | |
|---|---|---|---|---|
| 5,831,616 A | * | 11/1998 | Lee | 715/861 |
| 5,995,978 A | * | 11/1999 | Cullen et al. | 1/1 |
| 2003/0227468 A1 | * | 12/2003 | Takeda | 345/619 |
| 2005/0120307 A1 | | 6/2005 | Suzuki | |
| 2007/0065121 A1 | * | 3/2007 | Saito | 386/126 |
| 2007/0244915 A1 | * | 10/2007 | Cha et al. | 707/101 |
| 2008/0068456 A1 | | 3/2008 | Fujii et al. | |
| 2009/0300007 A1 | * | 12/2009 | Hiraoka | 707/5 |

FOREIGN PATENT DOCUMENTS

| | | |
|---|---|---|
| JP | 2002-185841 A | 6/2002 |
| JP | 2005-167469 | 6/2005 |
| JP | 2007-122694 A | 5/2007 |
| JP | 2008-182662 | 8/2008 |
| JP | 2008-252682 | 10/2008 |
| JP | 2009-224926 A | 10/2009 |

* cited by examiner

*Primary Examiner* — Son T Hoang
(74) *Attorney, Agent, or Firm* — Cowan, Liebowitz & Latman, P.C.

(57) ABSTRACT

An image searching apparatus has a search target decision unit which decides a search target image out of images stored in an image storing unit; a search content selection unit which obtains a search condition to indicate search content specified by a user operation; a search execution unit which executes content search processing for the search target image using the search condition; and a search result display control unit which displays the search result. If a bracketed image group is included in the image storing unit, the search target decision unit sets a representative image selected from the image group to a search target image, and excludes images other than the representative image in the image group from search targets.

16 Claims, 7 Drawing Sheets

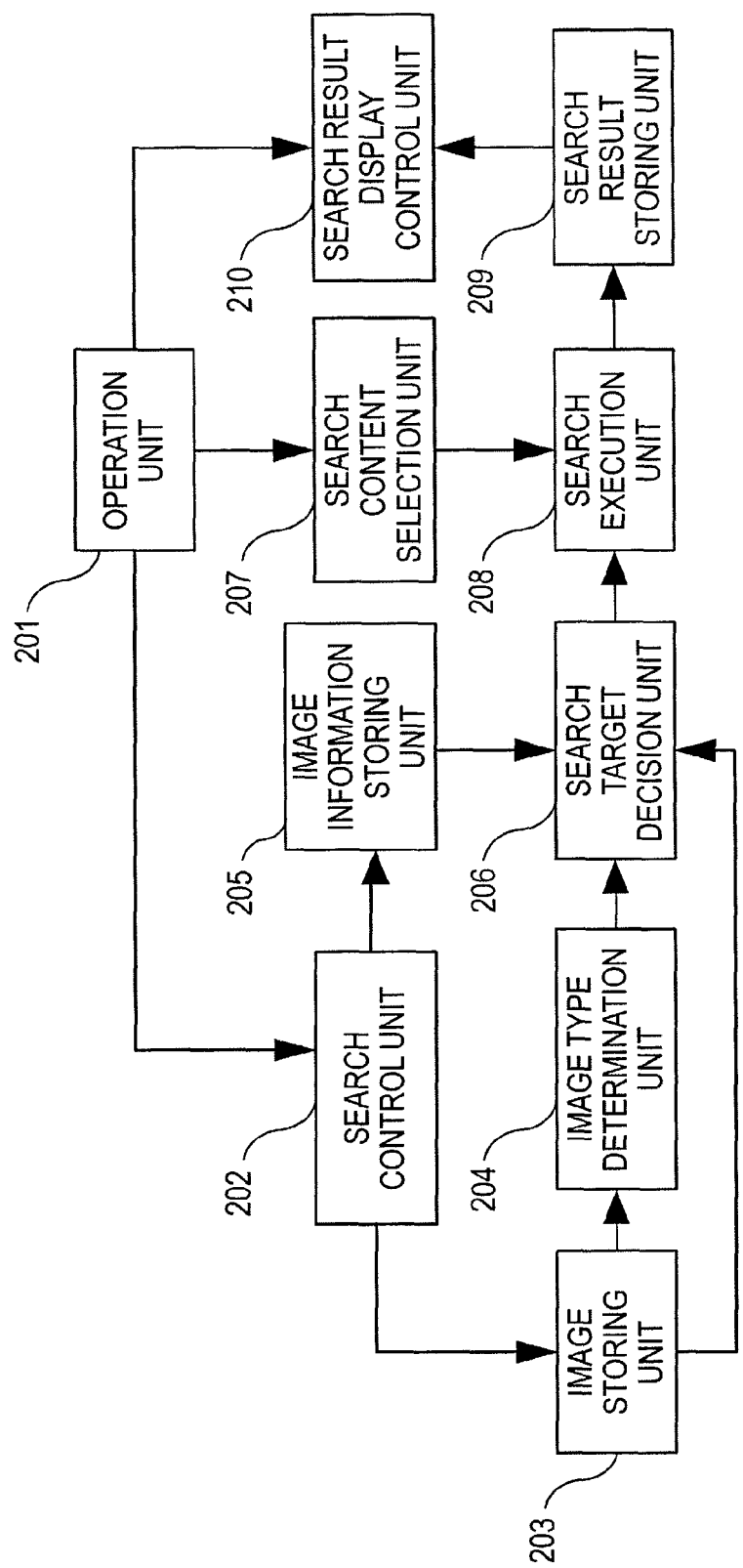

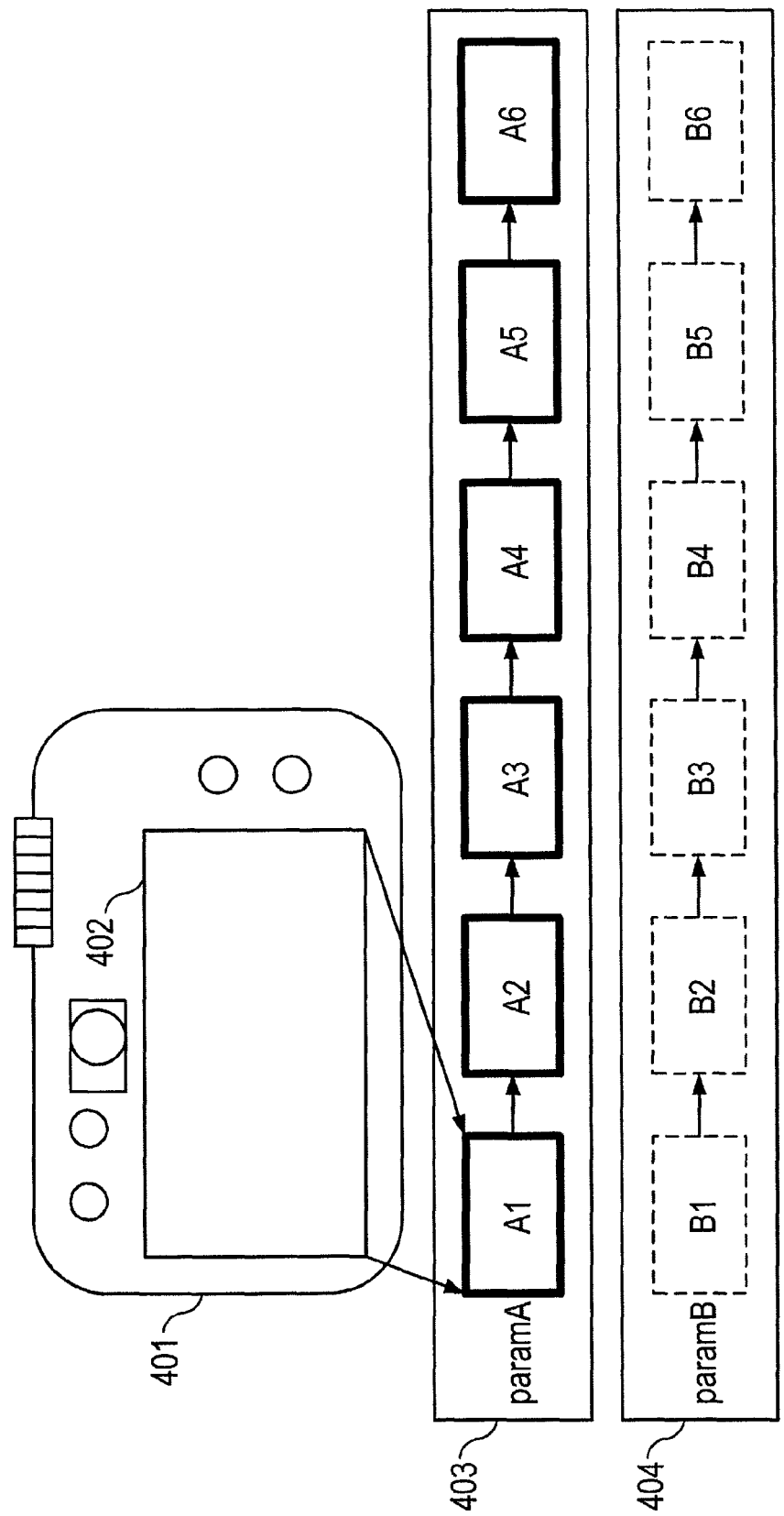

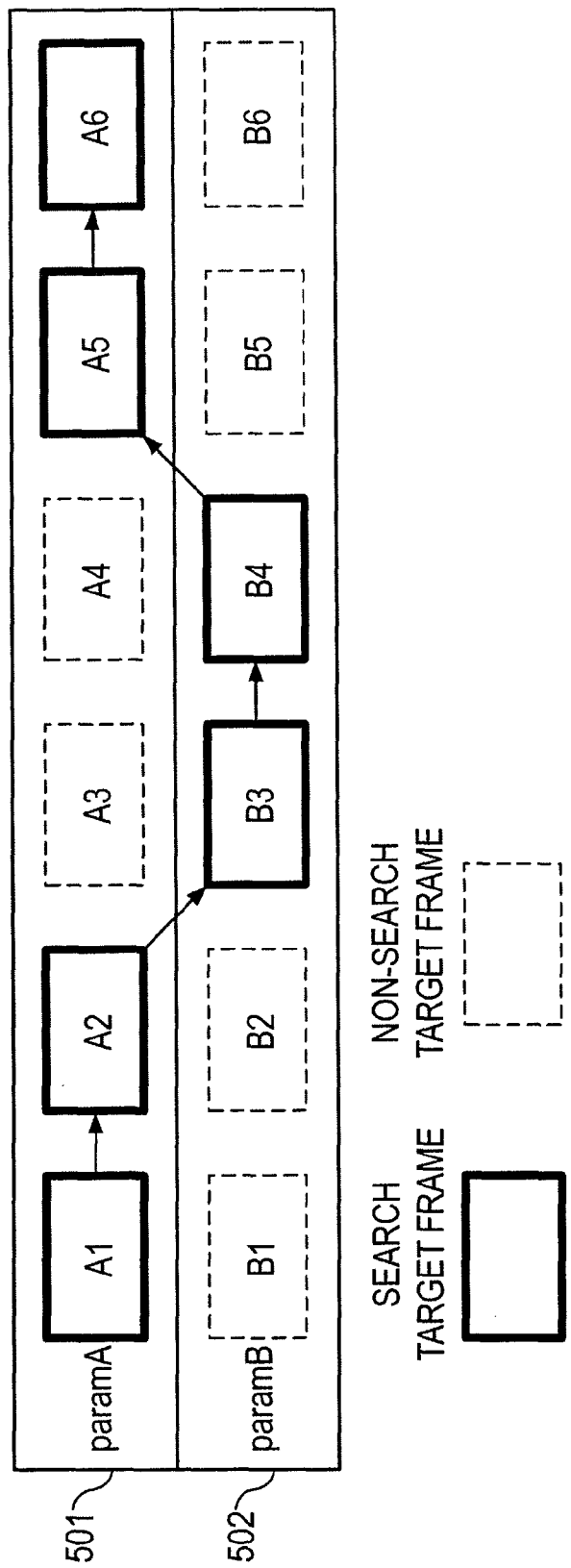

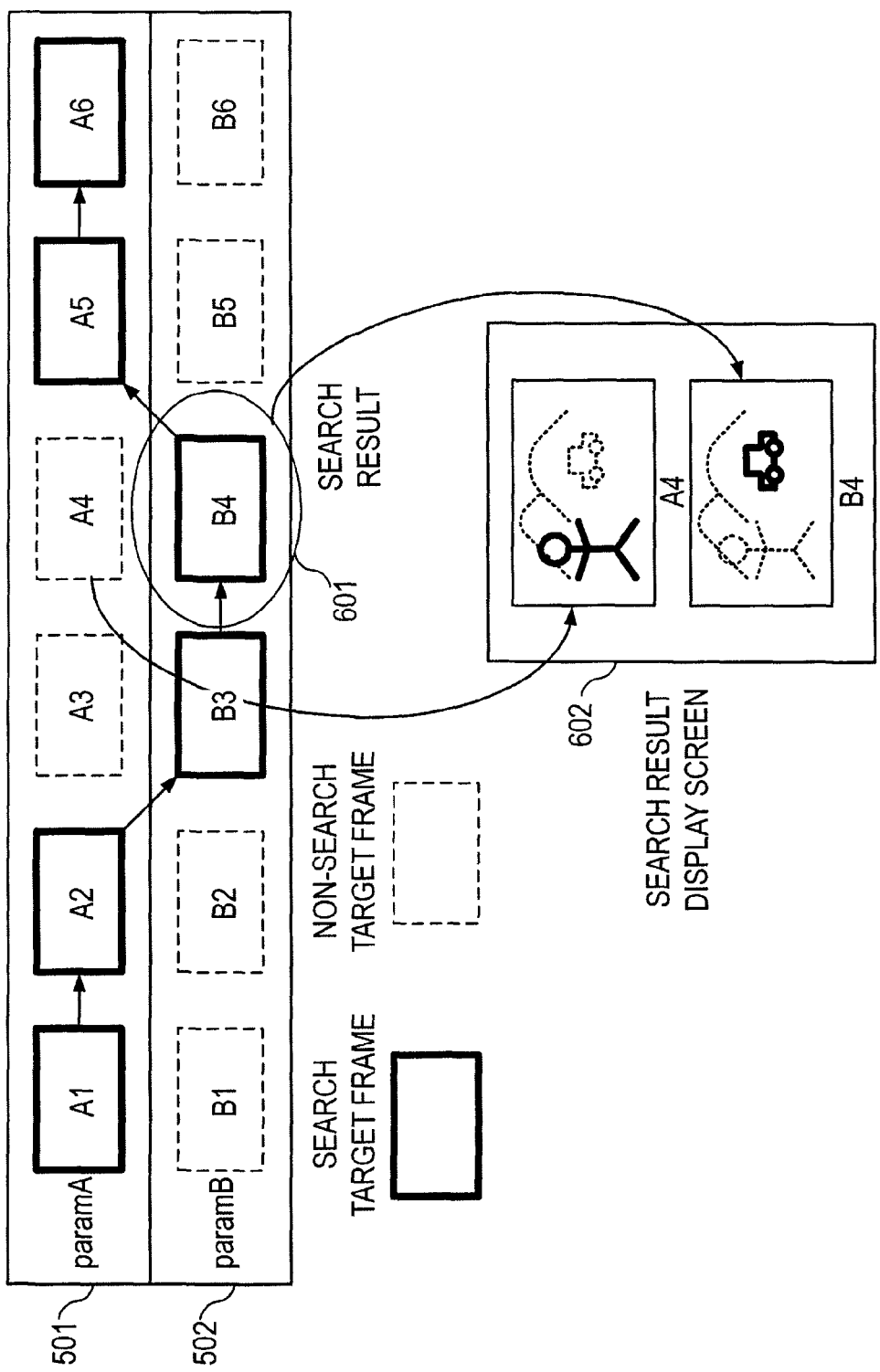

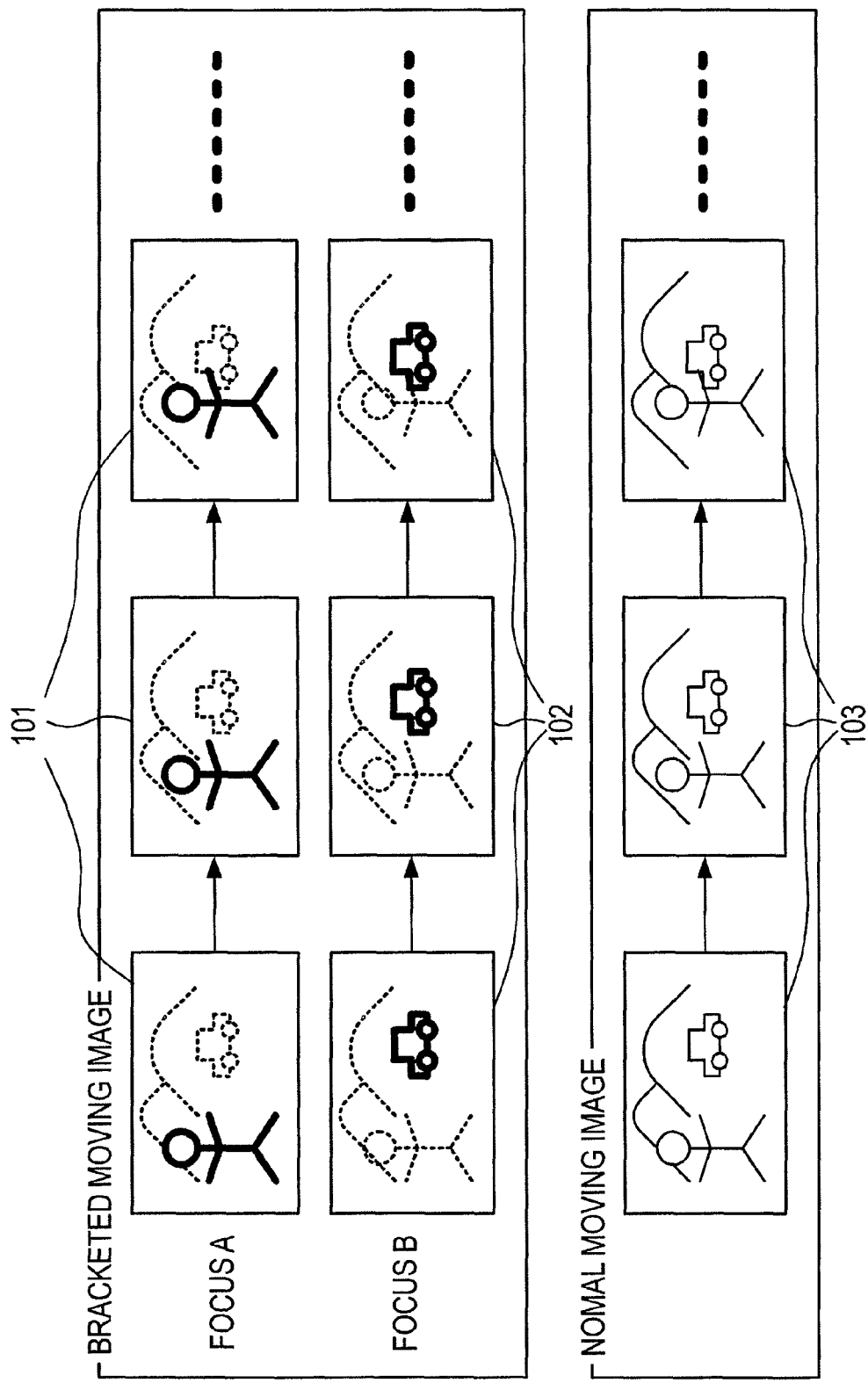

IMAGE SEARCHING APPARATUS AND IMAGE SEARCHING METHOD

BACKGROUND OF THE INVENTION

1. Field of the Invention

The present invention relates to an image searching apparatus and an image searching method for searching content from a still image or a moving image.

2. Description of the Related Art

A way of capturing an image with changing a plurality of image capturing parameters (image capturing conditions) when images of a same object are captured is called "bracket capturing". For example, in some cases, a user may continuously capture images using a reference exposure value selected when capturing a still image and a plurality of exposure values around the reference values. Then the user can select a desired image out of the captured images with the plurality of exposure values, and a failure, due to a mistake in selecting an image capturing parameter, can be prevented. This function is also useful when the user wants to keep the image capturing results with the plurality of different image capturing parameters.

Recently cases of capturing moving images with a digital single lens reflex camera are increasing, and compared with capturing images using a conventional digital video camera, various expressions using various interchangeable lenses are applied to moving images. Therefore in future, the demand for "bracketed moving images" which capture moving images by bracket capturing will probably increase.

Bracket capturing for moving images means recording and capturing each frame of a moving image using a plurality of image capturing parameters (image capturing conditions), and in this description a moving image captured like this is defined as a "bracketed moving image".

FIG. 6 shows an example of a bracketed moving image and a normal moving image. The parameter to be changed during bracket capturing is not limited to the above mentioned exposure, but could be various parameters, including focus, ISO sensitivity, white balance, angle of view and shutter speed. If a double lens camera, which can capture a 3-D image, is used to capture an image for the left eye and an image for the right eye, the respective view point position of the image for the left eye and the image for the right eye correspond to the image capturing parameters.

The upper part of FIG. 6 shows an example of a bracketed image when focus is changed as a bracket parameter. The frames indicated by a reference number 101 captured with focus A are in a state of focusing on a position of a person out of objects, and the frames indicated by a reference number 102 captured with focus B are in a state of focusing on a position of a vehicle. In the case of the frames 103 of the ordinary moving image shown at the lower part of FIG. 6, on the other hand, the image capturing parameter is one fixed value.

In the example in FIG. 6, when this bracketed moving image is reproduced, the user can select and regenerate a desirable image out of the frames 101 and frames 102. In concrete terms, the frames 101 are reproduced if the state of focusing on the position of a person is desirable, and the frames 102 are reproduced if the state of focusing on the position of a vehicle is desirable. It is also possible to switch the frames 101 and frames 102 during reproduction.

In the case of a bracketed image, an image of a similar scene or content is captured for a plurality of times, regardless whether it is a still image or a moving image, so data volume and a number of frames per object increase more than a normal moving image. In the case of the example of the bracketed moving image in FIG. 6, two types of focus (focus A and focus B) are used for the bracketed moving image, so a number of frames that is double a normal moving image is required, while a normal moving image is one moving image stream constituted by continuous frames.

When a desired image is retrieved from many images including a bracketed image, a good bit of waste is generated if all the data and frames simply become the searching target. For example, in the case of a bracketed image having different focus areas (focus A and focus B), as shown in FIG. 6, it takes search time double that of a normal moving image, even if the content of the image capturing target is similar in the frame group with focus A and the frame group with focus B. In the case of performing search processing for searching a desired image based on image recognition technology, even if the search target is a still image, the time required for search processing becomes long, if the number of still images is high. If the search target is a moving image, longer time is required for the search processing than the case of a search target that is a still image.

To retrieve a bracketed image, it has been proposed to select image capturing conditions and display an image group matching the image capturing conditions as the search result, so that the desired image can be easily retrieved (e.g. Japanese Patent Application Laid-Open No. 2008-252682).

Japanese Patent Application Laid-Open No. 2008-182662 discloses only "one frame display image", out of an image file consisting of "attribute information", a "main image" data, an "index display thumbnail image" data and "one frame display image" data.

Japanese Patent Application Laid-Open No. 2005-167469 discloses that if a thumbnail image, to which an identifier information for bracket capturing is attached, exists, a representative thumbnail image (e.g. thumbnail image having a central exposure value) is selected, and a list of thumbnail images is displayed.

According to the technology disclosed in Japanese Patent Application Laid-Open No. 2008-252682, if the image capturing conditions are attached to an image in such a format as meta data, this attached information is retrieved from all the images. Since a bracketed image is the target, it is effective to retrieve the image using the image capturing conditions.

However when all images are the search target, search time increases in proportion to the number of bracket parameters. Also recently it is common to retrieve content based on image recognition technology (e.g. searching an image which is "reddish" and "Mr. A" is captured), but the method of using image capturing conditions of prior art cannot be used for searching by content.

In the case of the technology according to Japanese Patent Application Laid-Open No. 2008-182662, a bracketed image is not assumed, so the search targets becomes "one frame display image" data of all bracketed images. Japanese Patent Application Laid-Open No. 2005-167469 is not based on the assumption that search processing is performed for searching a desired image using image recognition technology.

SUMMARY OF THE INVENTION

With the foregoing in view, it is an object of the present invention to provide a technology for decreasing the time required for search processing when content search is performed for a plurality of images including an image group obtained by bracket capturing.

The present invention in its first aspect provides an image searching apparatus for searching content from a still image or a moving image, comprising: an image storing unit which stores a plurality of images; a search target decision unit which decides a search target image out of the plurality of images stored in the image storing unit; a search content selection unit which obtains a search condition to indicate search content specified by a user operation; a search execution unit which executes content search processing for the search target image decided by the search target decision unit using the search condition obtained by the search content selection unit; and a search result display control unit which displays the search result of the search execution unit on a display unit, wherein if an image group obtained by capturing a same object under a plurality of image capturing conditions is included in the images stored in the image storing unit, the search target decision unit sets a representative image selected from the image group to a search target image, and excludes images other than the representative image in the image group from search targets.

The present invention in its second aspect provides an image searching method for searching content from a still image or moving image, wherein a computer executes: a search target decision step of deciding a search target image out of the plurality of images stored in an image storing unit; a search content selection step of obtaining a search condition to indicate search content specified by a user operation; a search execution step of executing content search processing for the search target image decided in the search target decision step, using the search condition obtained in the search content selection step; and a search result display control step of displaying the search result in the search execution step on a display unit, and wherein if an image group obtained by capturing a same object under a plurality of image capturing conditions is included in the images stored in the image storing unit, a representative image selected from the image group is set to a search target image, and images other than the representative image in the image group is excluded from search targets in the search target decision step.

According to the present invention, the time required for search processing can be decreased when content search is performed for a plurality of images including an image group obtained by bracket capturing.

Further features of the present invention will become apparent from the following description of exemplary embodiments with reference to the attached drawings.

BRIEF DESCRIPTION OF THE DRAWINGS

FIG. 2 is a diagram depicting a configuration of an image searching apparatus;

FIG. 3A to FIG. 3C are diagrams depicting a relationship of image capturing and a representative bracket parameter;

FIG. 4 is a diagram depicting the relationship of access and a representative bracket parameter;

FIG. 5 is a diagram depicting a display example of search results; and

FIG. 6 shows an example of a bracketed moving image.

DESCRIPTION OF THE EMBODIMENTS

Figure 1:
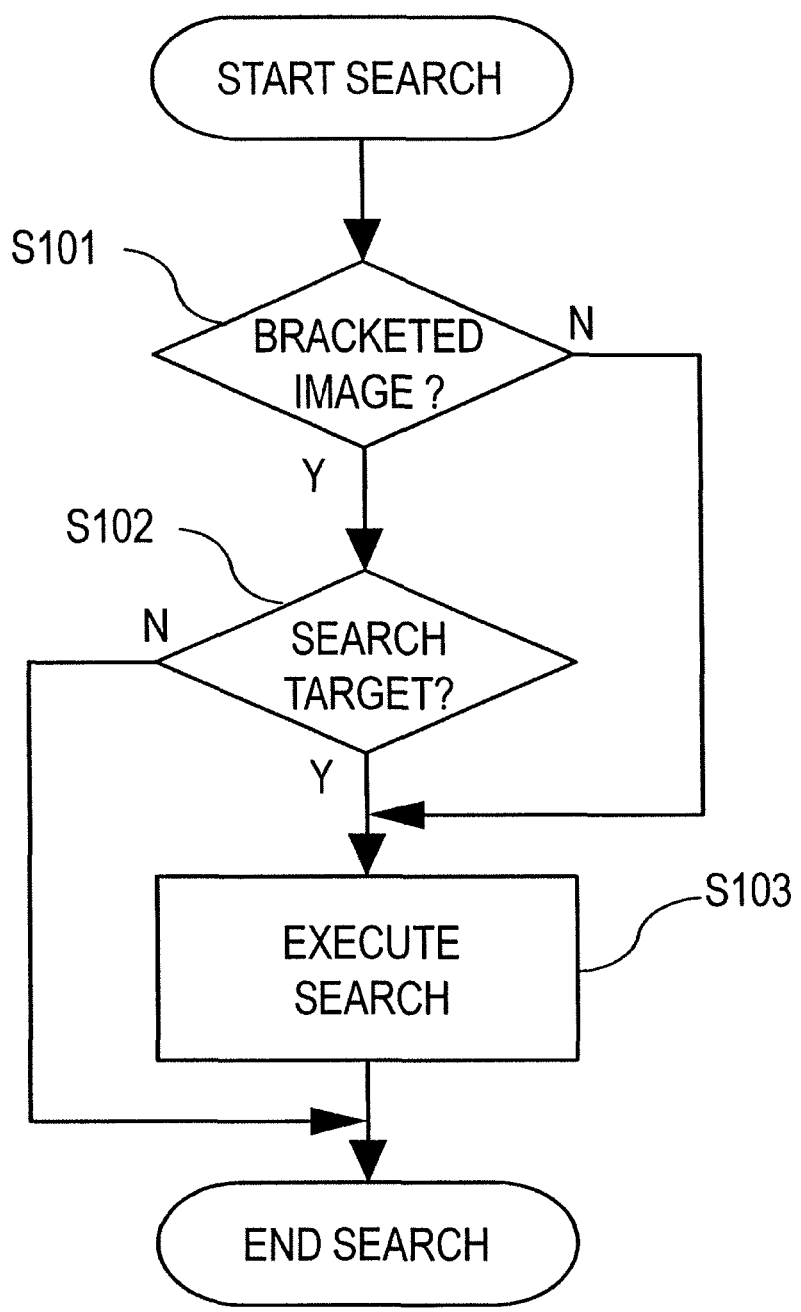
FIG. 1 is a flow chart for narrowing down the search targets.

The present invention relates to a technology for searching content from a digital image (regardless whether it is a still image or moving image), and preferably relates to searching content targeting an image group obtained by bracket capturing. Bracket capturing here refers to capturing images of a same object continuously or simultaneously using a plurality of different image capturing conditions (image capturing parameters), and an image obtained by bracket capturing is called a "bracketed image". Content search refers to search processing using image recognition technology or image analysis processing technology, such as a technology to select a desired image by collating characteristic quantities related to shape, color, size or the like of an object extracted from an image or recognition result of an object with a search key (search conditions).

Embodiment 1

FIG. 2 shows a configuration of an image searching apparatus. This image searching apparatus can be suitably applied to an apparatus for storing numerous image data (e.g. recorder, television, PC, digital video camera, digital camera). In FIG. 2, an operation unit 201 is a component for receiving input by a user, and examples are a switch and a remote controller disposed on a main body of an apparatus. An image storing unit 203, an image information storing unit 205 and a search result storing unit 209 are components for storing data, and examples are such storage devices as RAM, flash memory and hard disk. A search control unit 202, image type determination unit 204, search target decision unit 206, search content selection unit 207, search execution unit 208 and search result display control unit 210 are functional means implemented by a computer (e.g. CPU, MPU) in the apparatus executing programs. Although not shown in FIG. 2, the output of the search result display control unit 210 is displayed on a display unit (see display unit 402 in FIG. 3A) of the apparatus main unit, or a display device outside the apparatus. For the display unit and display device, a liquid crystal display, plasma display, organic EL display and FED (Field Emission Display), for example, can be used.

Now the flow of image search according to this embodiment will be described. The operation unit 201 instructs the search control unit 202 to retrieve when the user performed an operation related to image search. The search control unit 202, which received the search instruction, instructs the image storing unit 203 to output the image. The image storing unit 203, which received the image output instruction, outputs the stored image to the image type determination unit 204 and the search target decision unit 206. The image type determination unit 204 determines whether the image, which was input from the image storing unit 203, is a bracketed image, and outputs the determination result to the search target decision unit 206. It does not matter whether the bracketed image is a still image or a moving image.

Any method can be used for determining whether the image is bracketed or not. For example, the following methods can be used.

(1) Use meta data, which is attached to the image in advance, upon bracket capturing. An advantage of this method is that determination is easy. However this method cannot be used unless meta data is attached.

(2) The current target image, which was input to the image type determination unit 204, and the previous image, which was input, are compared, and their similarity is determined, and images are regarded as bracketed images if similar. This method can also be used for a bracketed image to which meta data is not attached. The method for determining similarity can be arbitrary, but is preferably simple, since if the processing used for determining similarity is complicated, then the time required for search processing becomes longer as result.

The image information storing unit 205 outputs the image information to the search target decision unit 206 according to the instruction from the search control unit 202. In this embodiment, the information stored in the image information storing unit 205 is representative bracket parameter information which was attached to image data stored in the image storing unit 203 upon capturing an image or by a user operation. This information is used for narrowing down the search targets from images captured with a plurality of bracket parameters to only those images having a representative bracket parameter. This will be described in concrete terms and in detail later.

The search target decision unit 206 decides whether the image which was input from the image storing unit 203 becomes a search target or not, using the determination result from the image type determination unit 204 and the image information from the image information storing unit 205. The image which was decided as a search target is sent to the search execution unit 208, but the image which was decided as outside the search target range is not sent to the search execution unit 208, and is not retrieved.

The search content selection unit 207 obtains a search key (also called a "search condition" or "search content") which the user input by operating the operation unit 201, and sends it to the search execution unit 208. The search execution unit 208 executes the content search for the image (search target image) sent from the search target decision unit 206, using the search key obtained from the search content selection unit 207.

In the case of a user searching an image which includes "red" and displays "Mr. A" (an image where Mr. A wearing red clothing is captured), for example, a search key to indicate "red" and "Mr. A" is sent from the search content selection unit 207 to the search execution unit 208 according to operation by the operation unit 201. To retrieve "red", the search execution unit 208 checks the ratio of data which indicates "red" in the image data, and regards that the image includes "red" if the ratio is a predetermined threshold or more. To retrieve "Mr. A", the search execution unit 208 compares the image with a preregistered facial image of "Mr. A" using face recognition, which is now a common technology, and checks if the face of "Mr. A" is included in the search target image. If "Mr. A" is recognized, the image is regarded as an image which includes "Mr. A". An image which is "red" and of "Mr. A" is an image which is included in both the search results of "red" and "Mr. A".

The content of the operation of the search content selection unit 207 and the search execution unit 208 described above is an example. The content sent from the search content selection unit 207 and the method used for the search execution unit 208 to retrieve images are not limited to the above examples.

The result retrieved by the search execution unit 208 is sent to the search result storing unit 209, and is displayed on the display unit 402 by the search result display control unit 210. The search result display control unit 210 changes the display content according to the instruction from the operation unit 201. For example, if the user selects one image out of the retrieved result images and performs the operation to enlarge the display, the search result display control unit 210 zooms in on the selected image, and displays it on the display unit 402.

Now the narrowing down of the search target is described with reference to a flow chart, and then the representative bracket parameter, which plays a critical role when narrowing down targets, will be described in detail.

FIG. 1 shows a flow chart on narrowing down the search targets.

When search is started, the image type determination unit 204 in FIG. 2 determines whether the image is a bracketed image (S101). If the image is not a bracketed image, it is selected as a search target by the search target decision unit 206 in FIG. 2. If the image is a bracketed image, the search target decision unit 206 in FIG. 2 decides whether the image is set to a search target image (S102). In concrete terms, the search target decision unit 206 compares the image capturing parameter (image capturing condition) of the bracketed image with the representative bracket parameter (predetermined condition) obtained from the image information storing unit 205. Then the search target decision unit 206 sets the image to be included in the search target images if the image capturing parameter of the bracketed image matches with the representative bracket parameter, or excludes the image from search targets if there is no match. Content search is executed for images being set to search target images (S103).

The representative bracket parameter is one parameter assigned to one content of a bracketed image. In the case of a bracketed image captured with five types of parameters, for example, one type of parameter thereof becomes a representative bracket parameter. In other words, according to the above mentioned narrowing down processing, an image (representative image) having the representative bracket parameter is selected out of the five-image group obtained by bracket capturing, and only this representative image becomes the search target.

The basic concept of narrowing down is to decrease the time required for the search processing by selecting only a representative image having one type of parameter as a search target, for the bracketed images of which content of objects is similar.

In this embodiment, a configuration of selecting only one representative image was shown, but M number of representative images may be selected from a group of N number of images ($1 \leq M < N$) obtained by bracket capturing. In other words, the time required for the search processing can be decreased by selecting, as search targets, less number of images than the number of images constituting an image group obtained by bracket capturing.

Now the representative bracket parameter, that is information of the image information storing unit 205, to be a reference of the above narrowing down processing, will be described.

In this embodiment, the representative bracket parameter is data to indicate information upon capturing an image, particularly data on a parameter which was focused on when bracket capturing was performed.

For example, when bracket capturing is performed focusing on exposure, an image is captured normally using an exposure value selected by the user (±0 EV is assumed here), and the values before and after thereof (+1 EV, −1 EV). In this case, the exposure value defined as ±0 EV is regarded as the representative bracket parameter.

A state of simultaneously capturing a plurality of moving image streams as bracketed moving images will now be described with reference to FIG. 3A. First the image capturing parameter is set to paramA (e.g. ±0 EV), and the frame A1 of the moving image stream 403 is captured, then the image capturing parameter is changed to paramB (e.g. +1 EV) and the frame B1 of the moving image stream 404 is captured. Then the images are captured for a same object alternately as A2, B2, A3 and B3 while switching the parameters between paramA and paramB, and as a result, the moving image streams 403 and 404 are recorded with different parameters.

In the case of the example shown in FIG. 3A, it is assumed that the frame group 403 with paramA is the moving image stream of a frame group the user selected as the representative bracket parameter, and is displayed on the display unit 402 while images are being captured with digital camera 401. The digital camera 401 is assumed to have a live view function (function that can capture images while checking the object on the display unit 402).

In this case, at the same time with image capturing with paramA, image capturing with paramB is also performed and recorded as a moving image stream 404 consisting of another frame group, since this is a bracketed moving image. The moving image stream 404, however, is not displayed on the display unit 402 or displayed smaller than the display of the moving image stream 403 when images are captured using the live view function.

Figure 3B:
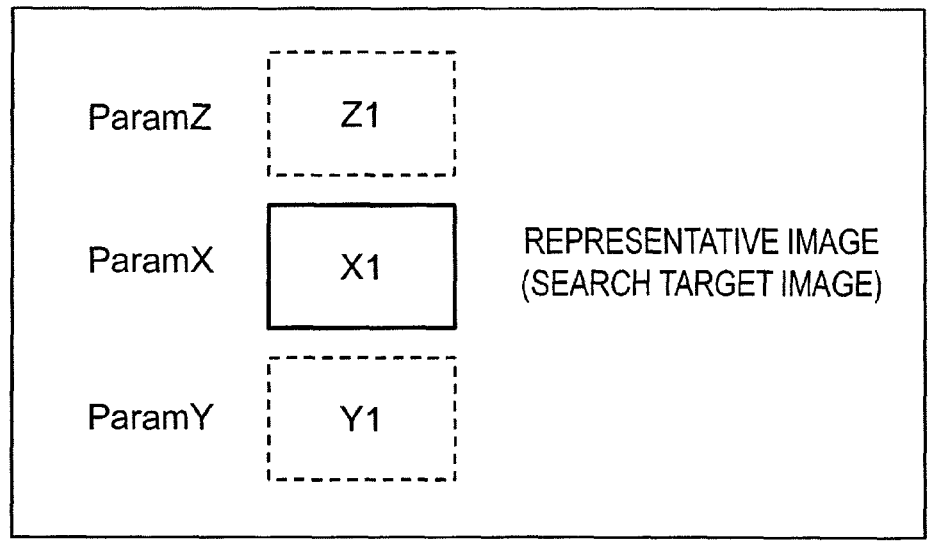

In the example shown in FIG. 3B, it is assumed that the still image X1 with paramX (e.g. ±0 EV) is a still image which the user selected as the representative bracket parameter, and is displayed on the display unit 402 while the digital camera 401 is capturing an image. In this case, images with paramY (e.g. +1 Ev) and with paramZ (e.g. −1 EV) are also captured simultaneously (or almost simultaneously) with image capturing with paramX, and recorded as still images Y1 and Z1, since this is a bracketed still image. If the digital camera 401 is a camera having a plurality of lenses, the image capturing using paramX, paramY and paramZ are executed simultaneously. If the digital camera 401 has a single lens, images are continuously captured using paramX, paramY and paramZ sequentially, so that the images are captured almost simultaneously.

The representative bracket parameter obtained like this is a parameter which the user is focusing on among a plurality of parameters upon capturing images, and the image captured with this parameter has a higher degree of importance compared with images captured with other parameters. Therefore the image captured with the representative bracket parameter should be selected as the search target image with priority when the search targets are narrowed down.

Figure 3C:
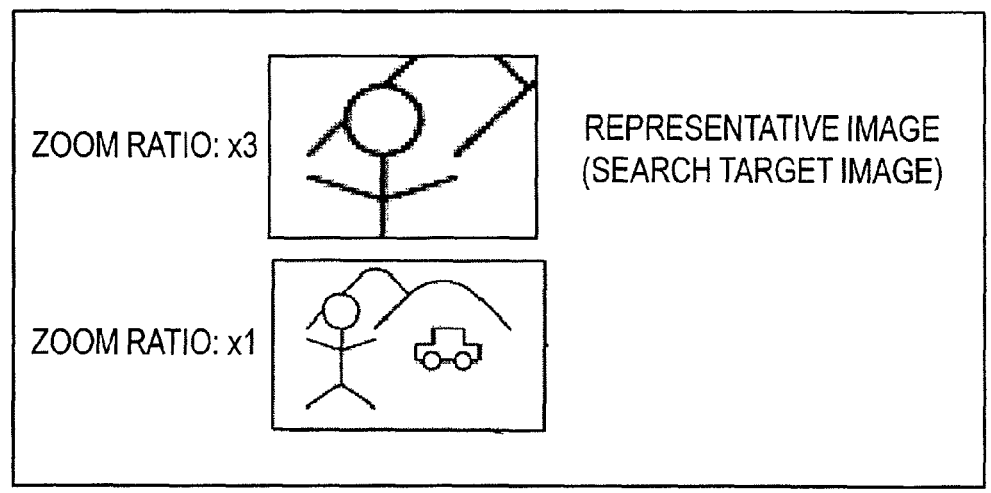

If bracket capturing is performed with a different angle of view, the highest zoom ratio is selected as the representative bracket parameter. For example, if bracket capturing is performed with zoom ratio ×1 and ×3, as shown in FIG. 3C, the image captured with the ×3 zoom ratio is selected to be the search target as a representative image. This is because it is more likely that the object is captured if a higher zoom ratio is used (more appropriate for face recognition processing as zoom ratio is higher, since object image is larger). If bracket capturing is performed with different focus positions, the shortest focal length is selected as the representative bracket parameter. This is because an object with a shorter focal length is closer to the camera than an object with a longer focal length, therefore this is regarded as a more important object. If bracket capturing is performed with different shutter speeds, the fastest shutter speed is selected as the representative bracket parameter. This is because a fast shutter speed generates less object blur. If bracket capturing is performed with different ISO sensitivities, the intermediate ISO sensitivity is selected as the representative bracket parameter (if bracket capturing is performed with a 100, 200 and 400 ISO sensitivity, a 200 ISO sensitivity is selected as the representative bracket parameter).

As described above, according to the present invention, the time required for search processing can be decreased, since less number of images than the number of images constituting the image group obtained by bracket capturing become search targets. The search targets can be a still image or a moving image, but the time required for search processing can be more dramatically decreased in the case when the search targets are moving images than the case when the search targets are still images.

Embodiment 2

In Embodiment 2, the viewed history of a user will be described as another example of a representative bracket parameter. For an image which has been accessed, out of the plurality of images stored in the image storing unit 203, the bracket parameter of this image is recorded as the representative bracket parameter (viewed history) in the image information storing unit 205. In this embodiment, the viewed history is recorded when the image is reproduced in an image reproducing unit (not illustrated). The recording method and recording timing of the viewed history are not limited to this, and viewed history may be recorded for an image displayed on the display unit 402 upon capturing images using a live view function, for example.

FIG. 4 shows the case of a bracketed moving images in particular. If the moving images are captured with two types of parameters: paramA and paramB, as shown in FIG. 4, the moving image stream 501 which is an image capturing result with paramA, and the moving image stream 502 which is an image capturing result with paramB, exist when a bracketed moving image is accessed.

In some cases, a user may view these bracketed moving images while switching the image with paramA and an image with paramB. An example is a case of a bracketed moving image of which rear side in the depth direction is focused when paramA is used, and the front side is focused if paramB is used, where a target focused on by the user is moving from back to front.

In FIG. 4, it is assumed that the viewing frames are reproduced in the sequence of frames A1 and A2 of the moving image stream 501, frames B3 and B4 of the moving image stream 502, and frames A5 and A6 of moving image stream 501. In this case, the bracket parameters for frames A1, A2, B3, B4, A5 and A6 are stored as representative bracket parameters. As a concrete example of the recording viewed history of the moving image stream, a viewed history flag, to indicate whether the moving image stream was accessed in a unit of a frame, may be attached, or a viewed history flag, to indicate whether the moving image stream was accessed in a unit of a scene, which consists of a plurality of frames, may be attached. A time code of an accessed moving image stream may be recorded. Or an access count flag, which indicates a number of times of access, may be added in a unit of a frame (or unit of a scene), so that only a frame (or scene) of which access count is high, is selected as a search target.

As shown in this embodiment, an image which reflects a preference and interest of a user during reproduction can be chosen as the search target by using a parameter selected when viewing the image as the representative bracket parameter.

Embodiment 3

The search result display control unit 210 not only displays an image sent from the search result storing unit 209, but also can simultaneously display other bracketed images captured from a same object if the search result is a part of the bracketed image. A part of the bracketed image indicates one image of the bracketed image group constituted by a plurality of images in the case of a still image, or one frame of a bracketed moving image constituted by a plurality of moving image streams in the case of a moving image. In other words, according to this embodiment, if a representative image of the bracketed images is included in the search result of the search execution unit 208, not only the representative image, but also images other than the representative image are displayed.

FIG. 5 shows this state. In this case, the frame B4 is a search result 601, but frame A4 is also displayed on the search result display screen 602. Since not only the image obtained as a result of capturing the search targets which were narrowed down, but also another bracketed image, which is strongly related to this image, is displayed simultaneously like this, the possibility of the user obtaining the desired image increases. In concrete terms, it is assumed that a frame which includes "red" and displays "Mr. A" is detected, but Mr. A is blurred in the display. In such a case, the frame with another focus value is simultaneously displayed if the image capturing is based on a focus bracket, then a more desirably frame in which "Mr. A" is focused can be obtained.

In the above embodiment, the search targets are only the images with the representative bracket parameter, but if the image group with the representative bracket parameter does not match with the search condition, search may be executed for images other than the images with the representative bracket parameter. Then search without leakage becomes possible. In other words, selecting the representative bracket parameter as the search target is selecting an image group having the top priority in search, that is, setting priority in the search target.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-32908, filed on Feb. 17, 2010, and Japanese Patent Application No. 2010-250749, filed on Nov. 9, 2010, which are hereby incorporated by reference herein in their entirety.

What is claimed is:

1. An image searching apparatus for searching a plurality of images, comprising:
   an image storing unit for storing the plurality of images; and
   a computer processor which implements each of the following units by executing programs stored in a memory:
      a search target decision unit which decides a search target image out of the plurality of images stored in the image storing unit;
      a search condition obtaining unit which obtains a search condition specified by a user operation;
      a search execution unit which executes search processing for the search target image decided by the search target decision unit using the search condition obtained by the search condition obtaining unit;
      a search result display control unit which displays the search result of the search execution unit on a display unit; and
      a determining unit which determines whether a predetermined image group is included in the plurality of images stored in the image storing unit based on metadata which is attached in advance to each of the plurality of images stored in the image storing unit,
      wherein the predetermined image group is an image group obtained by capturing multiple images continuously or simultaneously under a plurality of image capturing conditions, and
      wherein in response to determining that the predetermined image group is included in the plurality of images stored in the image storing unit, the search target decision unit identifies and sets a representative image of the predetermined image group as the search target image, and excludes images other than the representative image in the predetermined image group from the search target image and the search execution unit executes image search using the search target image decided by the search target decision unit.

2. The image searching apparatus according to claim 1, wherein if the predetermined image group obtained by capturing the multiple images continuously or simultaneously under a plurality of image capturing conditions is included in the plurality of images stored in the image storing unit and one of the plurality of image capturing conditions has been attached as a representative capturing condition to the predetermined image group upon image capturing or by a user operation, the search target decision unit selects, as the representative image, an image captured under the representative capturing condition, out of the predetermined image group.

3. The image searching apparatus according to claim 1, wherein the search target decision unit selects, as the representative image, an image having viewed history out of the predetermined image group.

4. The image searching apparatus according to claim 1, wherein if the representative image is included in the search result of the search execution unit, the search result display control unit displays the images other than the representative image in the predetermined image group on the display unit, in addition to the representative image.

5. The image searching apparatus according to claim 1, wherein the predetermined image group obtained by capturing continuously or simultaneously under the plurality of image capturing conditions consists of the multiple images captured each with an ISO sensitivity different from one another and the representative image is an image which is captured with an intermediate ISO sensitivity among the predetermined image group.

6. An image searching method for searching a plurality of images, wherein a computer executes:
   a search target decision step of deciding a search target image out of the plurality of images stored in an image storing unit;
   a search condition obtaining step of obtaining a search condition specified by a user operation;
   a search execution step of executing search processing for the search target image decided in the search target decision step, using the search condition obtained in the search condition obtaining step;
   a search result display control step of displaying the search result in the search execution step on a display unit; and
   a determining step of determining whether a predetermined image group is included in the plurality of images stored in the image storing unit based on metadata which is attached in advance to each of the plurality of images stored in the image storing unit,
   wherein the predetermined image group is an image group obtained by capturing multiple images continuously or simultaneously under a plurality of image capturing conditions, and,
   wherein in response to determining that the predetermined image group is included in the plurality of images stored in the image storing unit, a representative image of the predetermined image group is identified and set as the search target image, and images other than the representative image in the predetermined image group are excluded from the search target image in the search target decision step, and the image search is executed using the search target image decided in the search target decision step.

7. The image searching apparatus according to claim 1, wherein the predetermined image group obtained by capturing continuously or simultaneously under the plurality of image capturing conditions consists of of the multiple images captured each with a zoom ratio different from one another and the representative image is an image which is captured with a highest zoom ratio among the predetermined image group.

8. The image searching apparatus according to claim 1, wherein the predetermined image group obtained by capturing continuously or simultaneously under the plurality of image capturing conditions consists of the multiple images captured each with a focal length different from one another and the representative image is an image which is captured with a shortest focal length among the predetermined image group.

9. The image searching apparatus according to claim 1, wherein the predetermined image group obtained by capturing continuously or simultaneously under the plurality of image capturing conditions consists of the multiple images captured each with a shutter speed different from one another and the representative image is an image which is captured with a fastest shutter speed among the predetermined image group.

10. The image searching method according to claim 6, wherein if the predetermined image group obtained by capturing the multiple images continuously or simultaneously under the plurality of image capturing conditions is included in the plurality of images stored in the image storing unit and one of the plurality of image capturing conditions has been attached as a representative capturing condition to the predetermined image group upon image capturing or by a user operation, an image captured under the representative capturing condition is selected as the representative image, out of the predetermined image group, in the search target decision step.

11. The image searching method according to claim 6, wherein an image having viewed history is selected as the representative image, out of the predetermined image group, in the search target decision step.

12. The image searching method according to claim 6, wherein if the representative image is included in the search result of the search execution step, the images other than the representative image in the predetermined image group, in addition to the representative image, are displayed on the display unit in the search result display step.

13. The image searching method according to claim 6, wherein the predetermined image group obtained by capturing continuously or simultaneously under the plurality of image capturing conditions consists of the multiple images captured each with a zoom ratio different from one another and the representative image is an image which is captured with a highest zoom ratio among the predetermined image group.

14. The image searching method according to claim 6, wherein the predetermined image group obtained by capturing continuously or simultaneously under the plurality of image capturing conditions consists of the multiple images captured each with a focal length different from one another and the representative image is an image which is captured with a shortest focal length among the predetermined image group.

15. The image searching method according to claim 6, wherein the predetermined image group obtained by capturing continuously or simultaneously under the plurality of image capturing conditions consists of the multiple images captured each with a shutter speed different from one another and the representative image is an image which is captured with a fastest shutter speed among the predetermined image group.

16. The image searching method according to claim 6, wherein the predetermined image group obtained by capturing continuously or simultaneously under the plurality of image capturing conditions consists of the multiple images captured each with an ISO sensitivity different from one another and the representative image is an image which is captured with an intermediate ISO sensitivity among the predetermined image group.

* * * * *